United States Patent [19]

Koshizawa

[11] Patent Number: 4,821,854

[45] Date of Patent: Apr. 18, 1989

[54] BRAKE FORCE RETAINING CONTROL APPARATUS

[75] Inventor: Toshifumi Koshizawa, Kawasaki, Japan

[73] Assignee: Isuzu Motors Limited, Tokyo, Japan

[21] Appl. No.: 60,419

[22] Filed: Jun. 11, 1987

[30] Foreign Application Priority Data

Jun. 12, 1986 [JP] Japan .................... 61-136469

[51] Int. Cl.⁴ ........................................ B60K 41/28
[52] U.S. Cl. ........................ 192/0.072; 192/0.09; 192/0.094
[58] Field of Search ............... 192/0.072, 0.09, 0.094, 192/3 TR, 13 A

[56] References Cited

U.S. PATENT DOCUMENTS 4,618,040 10/1986 Honma et al. .............. 192/0.09
4,676,354 6/1987 Janiszewski et al. ......... 192/0.09

FOREIGN PATENT DOCUMENTS 60-11719 6/1983 Japan.
2167144 5/1986 United Kingdom.

Primary Examiner—Allan D. Herrmann
Attorney, Agent, or Firm—Staas & Halsey

[57] ABSTRACT

A brake force retaining control apparatus operates on the principle that an amount of depression of an accelerator pedal 20 varies with an angle of inclination of a road surface upon which a motor vehicle starts moving. An appropriate clutch position CLTi for releasing the motor vehicle brake is thereby established according to the amount of accelerator pedal depression. The brake force applied to the motor vehicle is released when a clutch 11 reaches the clutch position CLTi while the driver is depressing the accelerator pedal 20 and the clutch 11 is being automatically shifted from a disengaged position to an engaged position.

6 Claims, 3 Drawing Sheets

BRAKE FORCE RETAINING CONTROL APPARATUS

Cross-referenced to related application, the present invention is an improvement of the invention described in Japanese Patent Application No. 58-117483 (Japanese Laid-Open Patent Publication No. 60-11719).

BACKGROUND OF THE INVENTION

The present invention relates to a brake force retaining control apparatus for a motor vehicle equipped with an automatic transmission having a friction clutch controlled by an electronic control unit.

DESCRIPTION OF RELATED ART

When a motor vehicle equipped with a standard transmission is stopped on a hill and starts to move up hill, the driver pulls the emergency or parking brake with one hand to keep the motor vehicle braked, then depressing the accelerator pedal while simultaneously releasing the clutch, the driver releases the emergency brake. Since such a process is complex and requires coordinated operation of the emergency brake, accelerator pedal, and clutch, the driver is required to be highly skilled in order to start the vehicle moving smoothly up hill. If the procedure is not properly executed, the engine may stall and the motor vehicle may roll backwards.

In an effort to solve the above problem, the applicant has proposed a brake force retaining control apparatus as disclosed in Japanese Laid Open Patent Publication No. 60-11719 referred to above.

The disclosed brake force retaining apparatus is used on a motor vehicle having a synchromesh-type automatic transmission with a friction clutch controlled by an electronic control unit. The brake force retaining apparatus receives signals from various detectors on the motor vehicle to retain a braking force until the clutch is engaged by a hydraulic clutch actuator. By retaining the braking force, the motor vehicle is allowed to restart upon an uphill road smoothly without requiring skill on the part of the driver.

In such a brake force retaining apparatus, a check valve for the brake is always released at a constant clutch engaging position. Therefore, depending on the angle at which the road is inclined, the brake may be released too early allowing the motor vehicle to roll backward, or too late causing the motor vehicle to surge forward.

SUMMARY OF THE INVENTION

The present invention has been made in view of the aforesaid drawbacks.

It is an object of the present invention to provide a brake force retaining control apparatus capable of controlling a motor vehicle so as to start smoothly upon an incline by releasing the braking force at a suitable time dependent upon the amount of accelerator pedal depression. The depression of the accelerator pedal is varied by the operator as a function of the angle of inclination upon which the motor vehicle is to start.

To achieve the above object, there is provided in accordance with the present invention, a brake force retaining control apparatus for releasing a braking force in timed relation to the engaged condition or stroke of a clutch controlled by a signal from an electronic control unit. The brake force retaining control apparatus comprises sensor means for detecting the amount of accelerator pedal depression and engagement position determining means for determining an engaging position of the clutch in which the retained braking force is to be released.

With the present invention, irrespective of the road gradient on which the motor vehicle is stopped, an optimum braking force release timing can be determined according to the inclination of the road as judged by the driver of the motor vehicle, and a time taking into account a gear position for restarting the motor vehicle can be established.

The above and other objects, features and advantages of the present invention will become more apparent from the following description when considered with the accompanying drawings in which the preferred embodiment of the present invention is shown by way of illustrative example.

DESCRIPTION OF THE PREFERRED EMBODIMENT

Figure 1:
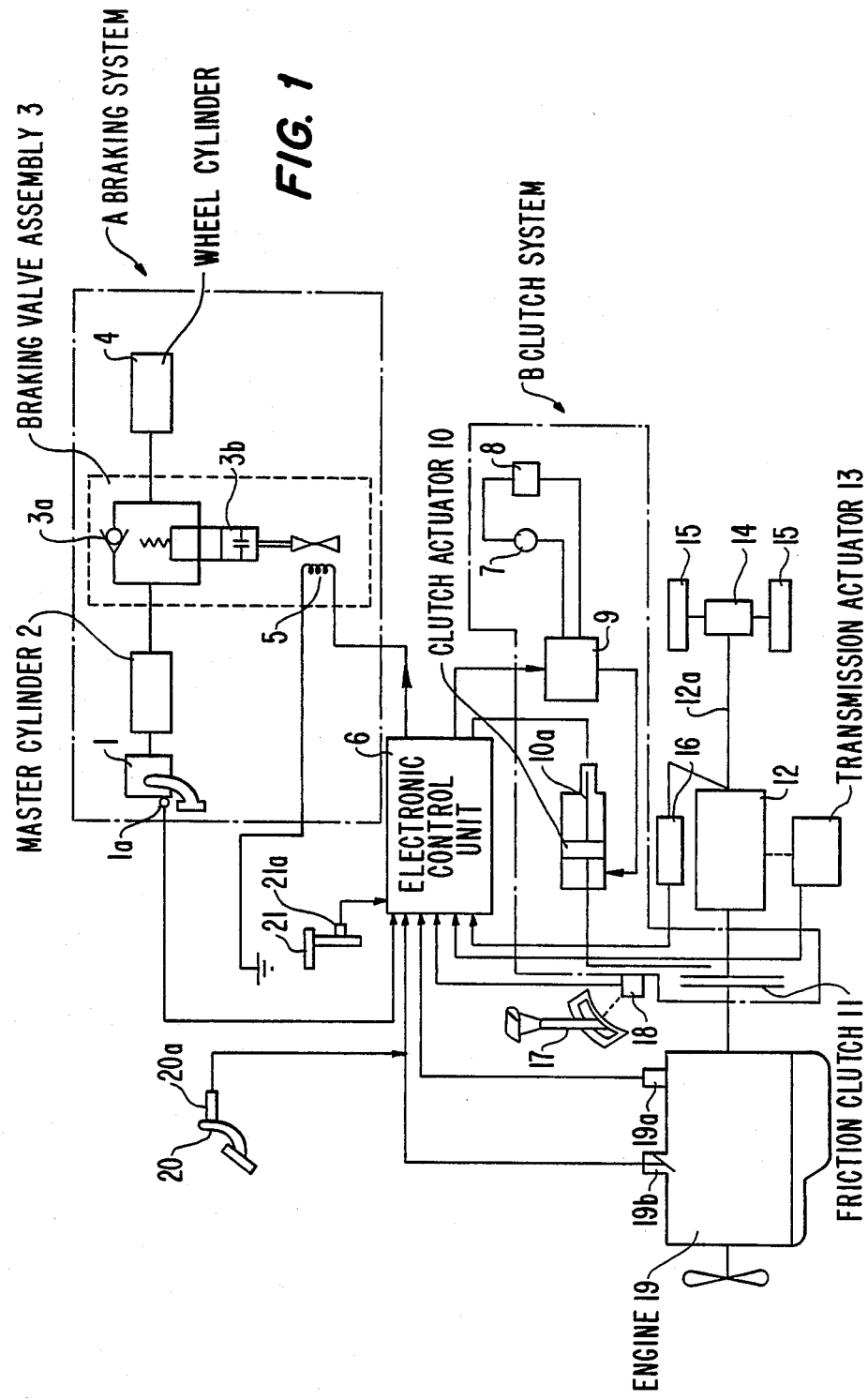
FIG. 1 is a block diagram of a brake force retaining control apparatus for a motor vehicle having an electronically controlled automatic transmission, according to the present invention.

FIG. 1 is a block diagram of a brake force retaining control apparatus for a motor vehicle having and electronically controlled automatic transmission, according to the present invention. As shown in FIG. 1, braking system A comprises a brake pedal 1, a brake pedal switch 1a, a master cylinder 2, a braking valve assembly 3, a wheel cylinder 4, and a solenoid coil 5. The braking valve assembly 3 comprises a check valve 3a for allowing a brake fluid to flow in a direction from the master cylinder 2 to the wheel cylinder 4 and prevents the brake fluid from flowing in the opposite direction when solenoid operated cutoff valve 3b connected in parallel with the check valve 3a is actuated. The solenoid operated valve 3b is switchable by the solenoid coil 5 to control the flow of brake fluid therethrough. While the solenoid coil 5 is energized after the brake pedal 1 has been depressed, the braking force is retained by the braking valve assembly 3 irrespective of the position of the brake pedal 1. If the brake pedal 1 is released and the solenoid coil 5 is de-energized, the braking force is no longer retained, i.e., the motor vehicle is no longer braked.

An electronic control unit 6 comprises a microcomputer for receiving signals from various detectors on the motor vehicle such as the brake pedal sensor 1a and energizes the solenoid coil 5 in order to retain the braking force or de-energizes the solenoid coil 5 in order to release the braking force. A clutch system B comprises a fluid pressure source 7, a fluid tank 8, a solenoid operated valve 9, a clutch actuator 10 operated by the solenoid operated valve 9, a clutch stroke sensor 10a, and a friction clutch 11.

Reference numeral 12 is a transmission, and reference numeral 13 identifies an actuator for actuating the transmission 12. The transmission 12 has output shaft 12a coupled to a differential gear 14 for transmitting engine power to wheels 15. The output shaft 12a is associated with the vehicle speed sensor 16 which applies its output signal to the electronic control unit 6. A select lever 17 is connected via a select position switch 18 to the electronic control unit 6 for determining a gear range of the transmission 12.

An engine 19 is coupled to the friction clutch 11. The power output from the engine 19 is controlled by depression of accelerator pedal 20 to control the opening of a throttle valve 19b. The engine 19 is associated with an engine rotation sensor 19a which supplies an output signal to the electronic control unit 6. The electronic control signal 6 is also supplied with an output signal from an accelerator pedal sensor 20a which is associated with the accelerator pedal 20 and detects the amount of depression thereof. The signal from the accelerator pedal sensor 20a and the vehicle speed signal from the vehicle speed sensor 16 are processed by the electronic control unit 6 for determining an optimum transmission gear position and producing a gear change signal to control the clutch actuator 10. The clutch stroke sensor 10a supplies the electronic control unit 6 with a signal indicative of the engaging condition (stroke) of the clutch 11 between its engaged and disengaged positions.

Reference numeral 21 is an emergency or parking brake, and reference numeral 21a identifies a parking brake switch for supplying the electronic control unit 6 with a signal representative of the parking brake 21 being depressed or released.

Figure 2:
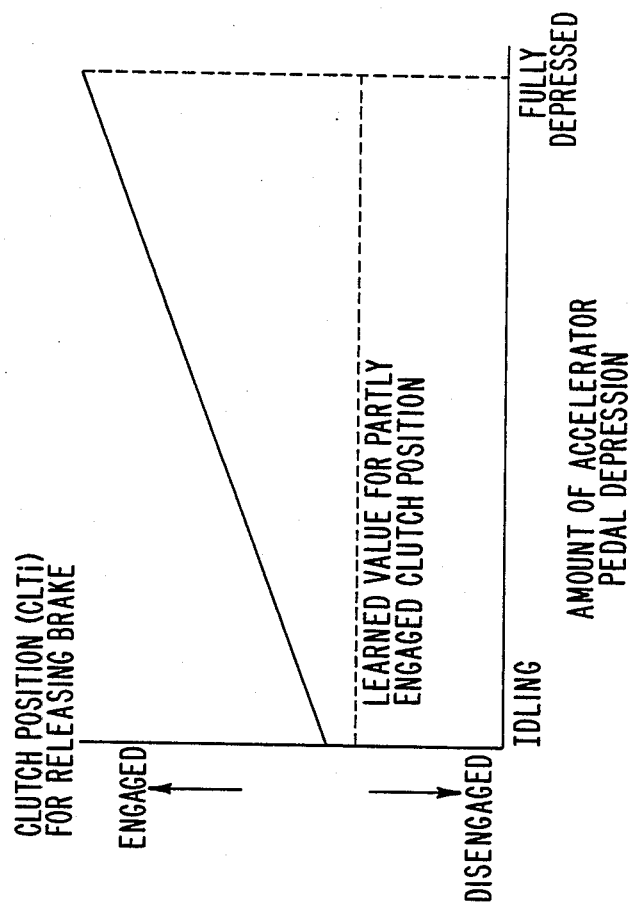
FIG. 2 is a graph of brake releasing clutch positions with respect to amounts of accelerator pedal depression.

FIG. 2 illustrates a graph of the clutch position (CLTi) when the brake is released, with respect to the amount of accelerator pedal depression detected by the accelerator pedal sensor 20a. As is apparent from FIG. 2, when the motor vehicle starts to move upon a gentle incline similar to a flat road, the clutch position CLTi is shallow at the time of releasing the brake of the braking system A. When the motor vehicle starts upon a steep sloping road, the clutch position CLTi at the time of releasing the brake, is deep so that after the friction clutch 11 has been engaged to transmit sufficient torque, the braking system A is released. A graph of data similar to that shown in FIG. 2 is stored in a memory within electronic control unit 6 for each of the gear positions which can be selected by the transmission 12.

Operation of the brake force retaining control apparatus will briefly be described below. Only when; (1) the selected gear position is other than a neutral gear position, (2) the vehicle speed is zero, (3) the gear position is in the lowest gear position (normally first gear position), (4) the engine is rotating, (5) the accelerator pedal sensor is off, (6) the brake pedal switch is on, and (7) the clutch stroke sensor is off, does the braking valve assembly 3 operate to prevent the break fluid from flowing from the wheel cylinder 4 to the master cylinder 2. Therefore, the motor vehicle continues to be braked even if the brake pedal 9 is released. The braking valve assembly 3 is released to allow the motor vehicle to move unbraked uphill only when; (1) the selected gear position is other than a neutral gear position, (2) the vehicle speed is not zero (the motor vehicle is not at rest), (3) the gear position is the lowest position (normally first gear position), (4) the engine is rotating, (5) the accelerator pedal sensor is on, and (6) the clutch stroke sensor is on.

Figure 3:
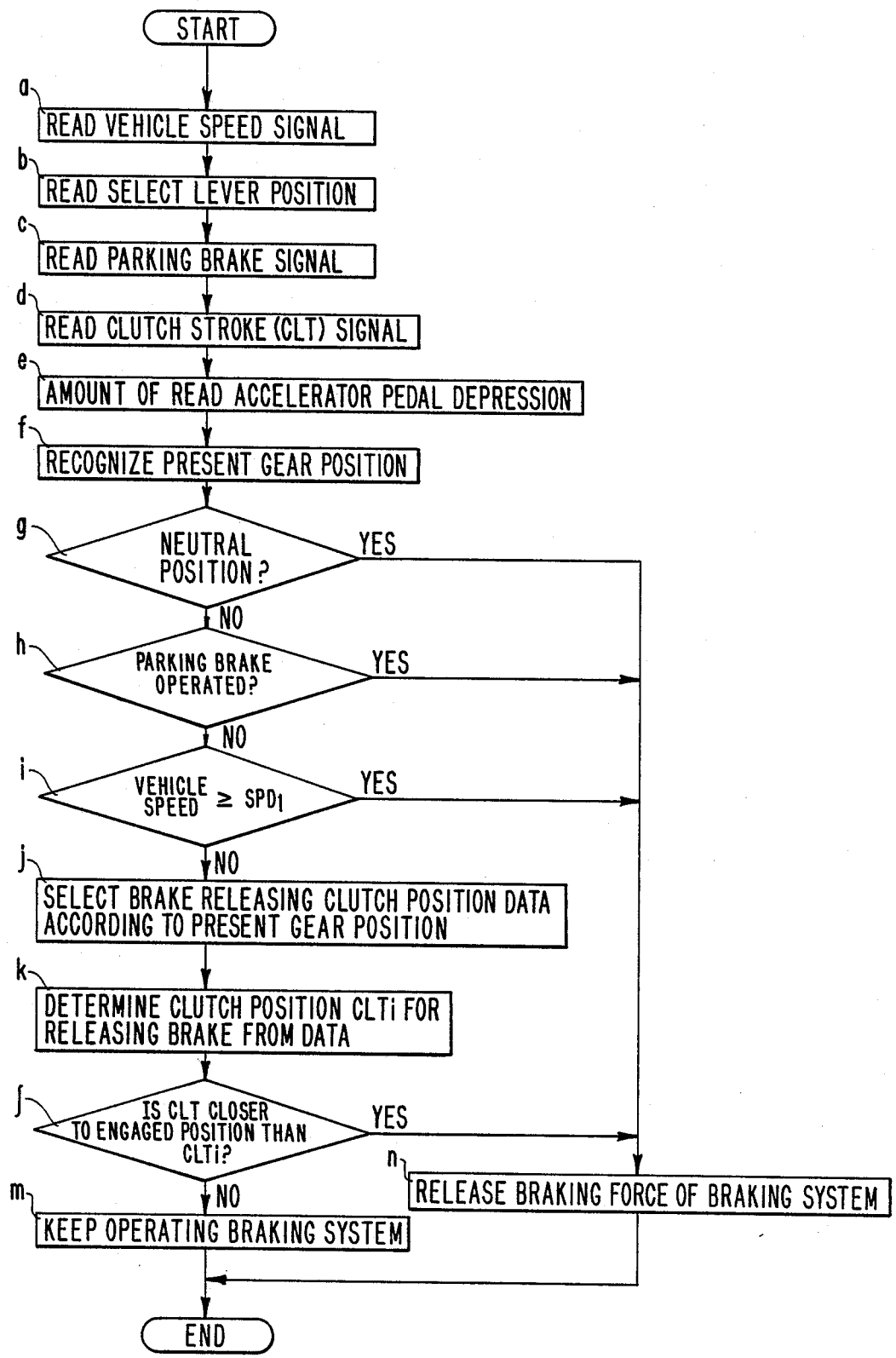
FIG. 3 is a flowchart of a control sequence for the brake force retaining control apparatus of the present invention.

Such operation of the braking force retaining control apparatus will hereinafter be described with reference to the flowchart in FIG. 3.

First, a vehicle speed signal, a select lever signal, a parking brake signal, a clutch stroke signal, and an amount of accelerator pedal depression are read from the vehicle speed sensor 16, the select position switch 18, the parking brake switch 21a, the clutch stroke sensor 10a, and the accelerator pedal sensor 20a, respectively, in steps a through e. Then, the present gear position is recognized by a signal from the transmission actuator 13 in step f.

Then, step g ascertains if the select lever 17 is in a neutral position (equal to zero), step h ascertains if the parking lever 21 is operated, and step i ascertains if the vehicle speed is at least a preset value SPD1.

If the select lever 17 is not in the neutral position, the parking lever 21 is released, and the vehicle speed is smaller than the preset value SPD1, then a graph of clutch positions for releasing the braking system A with respect to the present gear position is selected in step j. The clutch position CLTi for releasing the brake is determined from this graph in step k by referring to the amount of accelerator pedal depression read in step e.

The accelerator pedal 20 is depressed, and the clutch which has been disengaged starts being automatically and gradually engaged under a command from the electronic control unit 6. Then step 1 ascertains whether the present position CLT of the friction clutch 11 is closer to the engaged position than the clutch position CLTi for releasing the brake. If the clutch position CLT is not closer to the engaged position than the clutch position CLTi, the braking system A retains its braking force in step m.

If the clutch engaging position CLT is shifted closer to the engaged position than the clutch position CLTi, then the braking force is released in step n.

If the select lever 17 is in the neutral position in step g, or if the parking lever 21 is operated in step h, or if the vehicle speed is equal to or higher than the preset value SPD1 in step i, then the braking force is released in step n.

If the engaging position CLT of the friction clutch 11 does not reach the position CLTi, the braking force retention is not released and the cycle of steps a through m is repeated periodically after a preset period such as 100 msec. At this time, the select lever 17 is in the forward or reverse gear position, and the friction clutch 11 is engaged automatically based on a signal from the electronic control unit 6.

In the above embodiment, there has been described a brake force retaining control apparatus for a motor vehicle having an automatic transmission with a friction clutch which is controlled by an electronic control unit. However, the present invention is not limited to the illustrated embodiment, and various brake force retaining control modes may be constructed within the scope of the invention dependent upon the type of motor vehicle, the electronic control unit, etc.

According to the present invention, when a motor vehicle begins to move uphill, the motor vehicle is prevented from rolling backward due to the brake being released to early and from surging forward due to the brake being released to late. The clutch position for releasing the brake is varied according to the amount of accelerator pedal depression. By releasing the braking force at a suitable time according to the condition in which the motor vehicle runs, the motor vehicle can be smoothly started upon an inclined road or hill.

What is claimed is:

1. A brake force retaining control apparatus in a motor vehicle having a transmission, a friction clutch and an accelerator pedal, for controlling the release of a retained braking force within the motor vehicle, said brake force retaining control apparatus comprising:

first detecting means for detecting an amount of the accelerator pedal depression;

second detecting means for detecting an amount of clutch engagement;

third detecting means for detecting a gear position in the transmission;

fourth detecting means for detecting a travelling speed of the motor vehicle;

storing means for storing data corresponding to clutch positions for releasing the retained braking force dependent upon the detected amount of accelerator pedal depression;

determining means for determining a clutch engaging position in which to release the retained braking force, dependent upon the data stored in said storing means and the detected amount of accelerator pedal depression; and releasing means for releasing the retained braking force when the detected gear position is a running gear position, the detected travelling speed is less than a predetermined value and the detected amount of clutch engagement reaches the determined clutch engaging position.

2. A brake force retaining control apparatus according to claim 1 having a master cylinder and a wheel cylinder wherein said brake force retaining control apparatus further comprises:

a check valve operatively connected between the master cylinder and the wheel cylinder; and a solenoid operated valve operatively connected in parallel with said check valve.

3. A brake force retaining control apparatus in a motor vehicle having a transmission with selectable gears, a friction clutch and an accelerator pedal, for controlling the release of a retained braking force within the motor vehicle, said brake force retaining control apparatus comprising:

first detecting means for detecting an amount of the accelerator pedal depression;

second detecting means for detecting an amount of clutch engagement;

third detecting means for detecting a gear position in the transmission of the motor vehicle;

fourth detecting means for detecting a travelling speed of the motor vehicle;

storing means for storing data corresponding to each of the selectable gears and representing clutch positions for releasing the retained braking force dependent upon the detected amount of accelerator pedal depression;

determining means for determining a clutch engaging position in which to release the retained braking force, dependent upon the data stored in said storing means and the detected amount of accelerator pedal depression; and releasing means for releasing the retained braking force when the detected gear position is a running gear position, the detected travelling speed is less than a predetermined value and the detected amount of clutch engagement reaches the determined clutch engaging position.

4. A brake force retaining control apparatus according to claim 3 having a master cylinder and a wheel cylinder wherein said brake force retaining control apparatus further comprises:

a check valve operatively connected between the master cylinder and the wheel cylinder; and a solenoid operated valve operatively connected in parallel with said check valve.

5. A brake force retaining control apparatus in a motor vehicle having a transmission, friction clutch, accelerator pedal, vehicle speed sensor, gear select position switch, parking brake switch, clutch stroke sensor and transmission actuator, for controlling the release of a retained braking force within the motor vehicle, said brake force retaining control apparatus comprising:

detecting means for detecting an amount of accelerator pedal depression;

memory means for storing data from the vehicle speed sensor, the gear select position switch, the parking brake switch, the clutch stroke sensor, said detecting means and the transmission actuator, corresponding to detected accelerator pedal depression, clutch engagement, gear position in the trasmission and travelling speed of the motor vehicle;

storing means for storing data corresponding to clutch positions for releasing the retained braking force dependent upon the detected amount of accelerator pedal depression;

determining means for determining a clutch engaging position in which to release the retained braking force, dependent upon the data stored in said storing means and the detected amount of accelerator pedal depression; and releasing means for releasing the retainned braking force when the detected gear position is a running gear position, the detected travelling speed is less than a predetermined value and the detected amount of clutch engagement reaches the determined clutch engaging position.

6. A brake force retaining control apparatus in a motor vehicle having a transmission with selectable gears, friction clutch accelerator pedal, vehicle speed sensor, gear select position switch, parking brake switch, clutch stroke sensor and transmission actuator, for controlling the release of a retained braking force within the motor vehicle, said brake force retaining control apparatus comprising:

first detecting means for detecting an amount of accelerator pedal depression;

second detecting means for detecting a gear position in the transmission of the motor vehicle;

memory means for storing data from the vehicle speed sensor, the gear select position switch, the parking brake switch, the clutch stroke sensor, said first detecting means and the transmission actuator corresponding to detected accelerator pedal depression, clutch engagement, gear position in the transmission and travelling speed of the motor vehicle;

storing means for storing data corresponding to each of the selectable gears and representing clutch positions for releasing the retained braking force dependent upon the detected amount of accelerator pedal depression;

determining means for determining a clutch engaging position in which to release the retained braking force, dependent upon the data stored in said storing means and the detected amount of accelerator pedal depression; and releasing means for releasing the retained braking force when the detected gear position is a running gear position, the detected travelling speed is less than a predetermined value and the detected amount of clutch engagement reaches the determined clutch engaging position.

* * * * *